US012681952B1

(12) United States Patent
Ayachit et al.

(10) Patent No.: US 12,681,952 B1
(45) Date of Patent: Jul. 14, 2026

(54) OPTIMIZED RECONCILIATION BETWEEN CLOUD NETWORKS

(71) Applicant: Cohesity, Inc., San Jose, CA (US)

(72) Inventors: Prajakta Ayachit, Bangalore (IN); Prann Bansal, Faridkot (IN); Furquan Bijapure, Solapur (IN)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/829,970

(22) Filed: Sep. 10, 2024

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC ............................. G06F 16/27; G06F 16/2365
See application file for complete search history.

(56) References Cited

U.S. PATENT DOCUMENTS 9,002,799 B2 * 4/2015 Ngo .......................... G06F 3/067
707/655
11,803,453 B1 * 10/2023 Bunker ............... G06F 11/0751

2014/0172793 A1 * 6/2014 Stritzel ............... G06F 16/1756
707/634
2019/0207929 A1 * 7/2019 Koorapati ............... G06F 16/11
2020/0218618 A1 * 7/2020 Gokhale ................. G06F 16/25
2023/0051934 A1 * 2/2023 Devan ................. G06F 11/0727
2024/0070166 A1 * 2/2024 Innocenti ............... G06F 16/27

FOREIGN PATENT DOCUMENTS

WO WO-2021173292 A1 * 9/2021 ............. G06F 3/065

* cited by examiner

*Primary Examiner* — Albert M Phillips, III
(74) *Attorney, Agent, or Firm* — Shumaker & Sieffert, P.A.

(57) ABSTRACT

Techniques are described for optimizing reconciliation between cloud networks. In some examples, a data platform may store a local copy of data, in which a remote cloud service stores a source copy of the data. The data platform may initiate a resynchronization of the local copy with the source copy stored by the remote cloud service and obtain an indication the resynchronization is incomplete. The data platform may determine if a first subset of the data satisfies one or more validity checks and determine if a second subset of the data is out-of-sync with the source copy of the data at the remote cloud service based on the one or more validity checks. According to at least one example, The data platform initiates a full download of the second subset of the data to the storage system of the data platform from the remote cloud service.

20 Claims, 3 Drawing Sheets

300

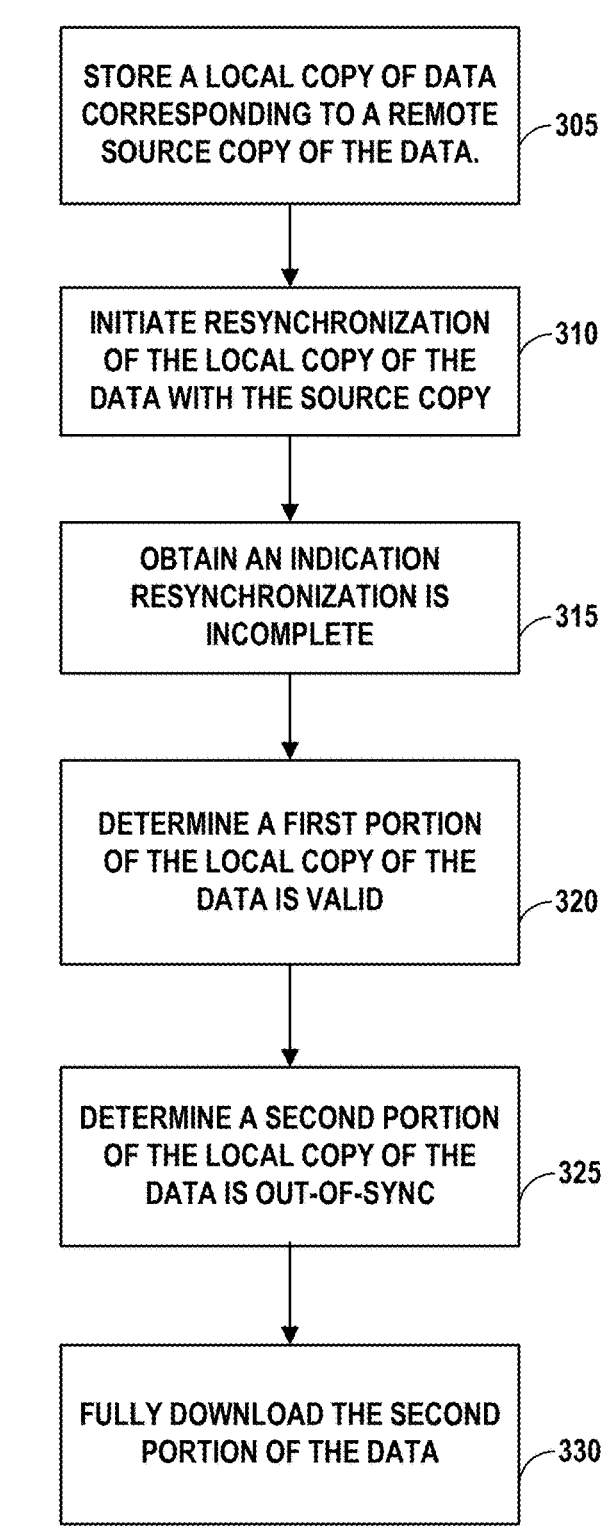

STORE A LOCAL COPY OF DATA
CORRESPONDING TO A REMOTE
SOURCE COPY OF THE DATA.          305

INITIATE RESYNCHRONIZATION
OF THE LOCAL COPY OF THE
DATA WITH THE SOURCE COPY        310

OBTAIN AN INDICATION
RESYNCHRONIZATION IS
INCOMPLETE                        315

DETERMINE A FIRST PORTION
OF THE LOCAL COPY OF THE
DATA IS VALID                     320

DETERMINE A SECOND PORTION
OF THE LOCAL COPY OF THE
DATA IS OUT-OF-SYNC              325

FULLY DOWNLOAD THE SECOND
PORTION OF THE DATA              330

FIG. 3

OPTIMIZED RECONCILIATION BETWEEN CLOUD NETWORKS

TECHNICAL FIELD

This disclosure relates to data platforms for computing systems.

BACKGROUND

Data platforms that support computing applications require executing various tasks, including periodically repeating customer tasks, background tasks, and overhead tasks. These tasks support the customer's direct or indirect objectives and the overall efficiency of the data platform. A data platform is a comprehensive technology framework that allows for the collection, storage, management, analysis, and visualization of data, designed to help organizations efficiently handle large volumes of data and extract valuable insights.

Some data platforms operate within a multi-cloud environment, in which customer data may be stored across multiple distinct cloud providers. In certain circumstances, customer data may be replicated (e.g., copied) between the distinct cloud providers, which introduces the potential for data drift or discrepancies between the multiple copies of customer data, which are intended to be identical. A multi-cloud environment refers to the use of multiple cloud computing services from different cloud providers within a single architecture. This approach allows organizations to leverage the strengths of various cloud platforms and avoid over-reliance on a single provider. In the context of multi-cloud environments, synchronization and re-synchronization between cloud platforms ensures that data and applications are consistent and up-to-date across the different cloud services or environments.

SUMMARY

Aspects of this disclosure describe techniques that may enable rapidly reconciliation of copies of data across multiple cloud providers without the need for a complete data backup. Additionally, these techniques may enable the resynchronization of metadata while minimizing excessive access latency, avoiding throttling by a remote cloud service provider, and eliminating the need for extensive monitoring of data status changes.

When data managed by a data platform is distributed among multiple data providers, resynchronization operations may become necessary to validate that a data copy is current or to synchronize a local data copy at the data platform with a remote copy located with a different cloud provider. Additionally, data copies may drift and become out-of-sync due to factors beyond changes at a single location. For example, internal bugs within a cloud platform may lead to out-of-sync data between data copies. Errors on the source side may also contribute to synchronization issues, as can expired Graph Delta links. Graph Delta links refer to links or tokens utilized to access or synchronize data between different cloud providers. Various events, such as security updates, link expiration over time, or modifications to access permissions, may invalidate these links or tokens, resulting in errors by a data platform executing resynchronization operations.

Alternative to performing resynchronization operations, full backup operations may be performed. During a full backup, all data for a particular customer, organization, or directory is downloaded in its entirety from a source location at a remote cloud service provider. However, full backups are resource-intensive due to the volume of data that must be downloaded compared to downloading only the changes to data and metadata updates during resynchronization operations. Such extensive downloads can lead to resource and IO bottlenecks on the data platform, potentially disrupting regular Service Level Agreements (SLAs) for the customer or organization and possibly for multiple entities serviced by the data platform due to the excessive loads while the full backup is in process.

Furthermore, full backups may induce increased latency due to data unavailability during the full backup as well as trigger throttling by the remote cloud service provider. This can extend the time required to complete a full data download and impose significant IO and computational loads on the backup system. The issue of prolonged full backup times and associated throttling is a well-documented problem.

Techniques for optimized reconciliation between cloud networks enable minimizing resource costs, time, and the risk of throttling by circumventing the need for full data downloads. Implementation of such approaches may avoid or reduce the excessive consumption of computing resources, which in turn enhances the performance of the data platform itself. By strategically managing data synchronization processes, these techniques reduce the demand on processor cycles, lower memory usage, and lessen the load on memory bus bandwidth. Such optimizations may therefore result in reduced power consumption, as fewer computational resources are required to process and transfer data. Energy reduction optimizations, when multiplied across many computing devices within multiple compute pods of a data center, and then multiplied again by the growing number of data centers across the globe, result in power savings that can be staggering. Thus, in addition to reduction of data subscription costs and latency, the reduction of power consumption at scale across many datacenters provides real-world economic and environmental benefits. In such a way, the streamlined approach not only improves the efficiency of the data platform itself but also ensures that total system resources are used more effectively, thereby contributing to a more sustainable and responsive cloud environment.

In one instance, various aspects of the techniques are directed to a method. The exemplary method may include storing, by processing circuitry of a data platform, a local copy of data via the storage system of the data platform, wherein a remote cloud service stores a source copy of the data on a remote storage system of the remote cloud service. According to such an example, the method may also initiate a resynchronization of the local copy of the data stored by the storage system of the data platform with the source copy stored by the remote cloud service and obtain an indication the resynchronization of the local copy of the data from the source copy is incomplete. The method may further include determining that a first subset of the data stored via the storage system of the data platform satisfies one or more validity checks and determining that a second subset of the data stored via the storage system of the data platform is out-of-sync with the source copy of the data stored by the remote cloud service based on the one or more validity checks. According to at least one example, the method further includes initiating a full download of the second subset of the data to the storage system of the data platform from the remote cloud service.

In another instance, various aspects of the techniques are directed to a data platform having processing circuitry, a storage system, a file checker, a file fixer, and non-transitory computer readable media. In such an example, the instructions, when executed by the processing circuitry, configure the processing circuitry of the data platform to perform various operations. For instance, the instructions may configure the processing circuitry to store, by the processing circuitry, a local copy of data via the storage system of the data platform, wherein a remote cloud service stores a source copy of the data on a remote storage system of the remote cloud service. The processing circuitry may initiate a resynchronization of the local copy of the data stored by the storage system of the data platform with the source copy stored by the remote cloud service and obtain an indication that the resynchronization of the local copy of the data from the source copy is incomplete. The data platform may, via the processing circuitry using the file checker, determine that a first subset of the data stored via the storage system of the data platform satisfies one or more validity checks and determine that a second subset of the data stored via the storage system of the data platform is out-of-sync with the source copy of the data at the remote cloud service based on the one or more validity checks. In such an example, the data platform may, via the processing circuitry using the file fixer, initiate a full download of the second subset of the data to the storage system of the data platform from the remote cloud service.

In another instance, various aspects of the techniques are directed to computer-readable storage media having instructions that, when executed, configure processing circuitry to perform various operations. In such an example, the instructions, when executed, may configure processing circuitry to store a local copy of data via the storage system of the data platform, wherein a remote cloud service stores a source copy of the data on a remote storage system of the remote cloud service. The instructions may also configure the processing circuitry to initiate a resynchronization of the local copy of the data stored by the storage system of the data platform with the source copy stored by the remote cloud service and obtain an indication the resynchronization of the local copy of the data from the source copy is incomplete. In some examples, the instructions, when executed, configure the processing circuitry to determine that a first subset of the data stored via the storage system of the data platform satisfies one or more validity checks and determine that a second subset of the data stored by the storage system of the data platform is out-of-sync with the source copy of the data at the remote cloud service based on the one or more validity checks. According to at least one example, the instructions, when executed, configure the processing circuitry to initiate a full download of the second subset of the data to the storage system of the data platform from the remote cloud service.

BRIEF DESCRIPTION OF THE DRAWINGS

FIG. 3 is a flowchart illustrating an example for rapidly reconciling copies of data across multiple cloud providers without the need for a complete data backup, in accordance with one or more techniques of the present disclosure.

Like reference characters denote like elements throughout the text and figures.

DETAILED DESCRIPTION

Figure 1:
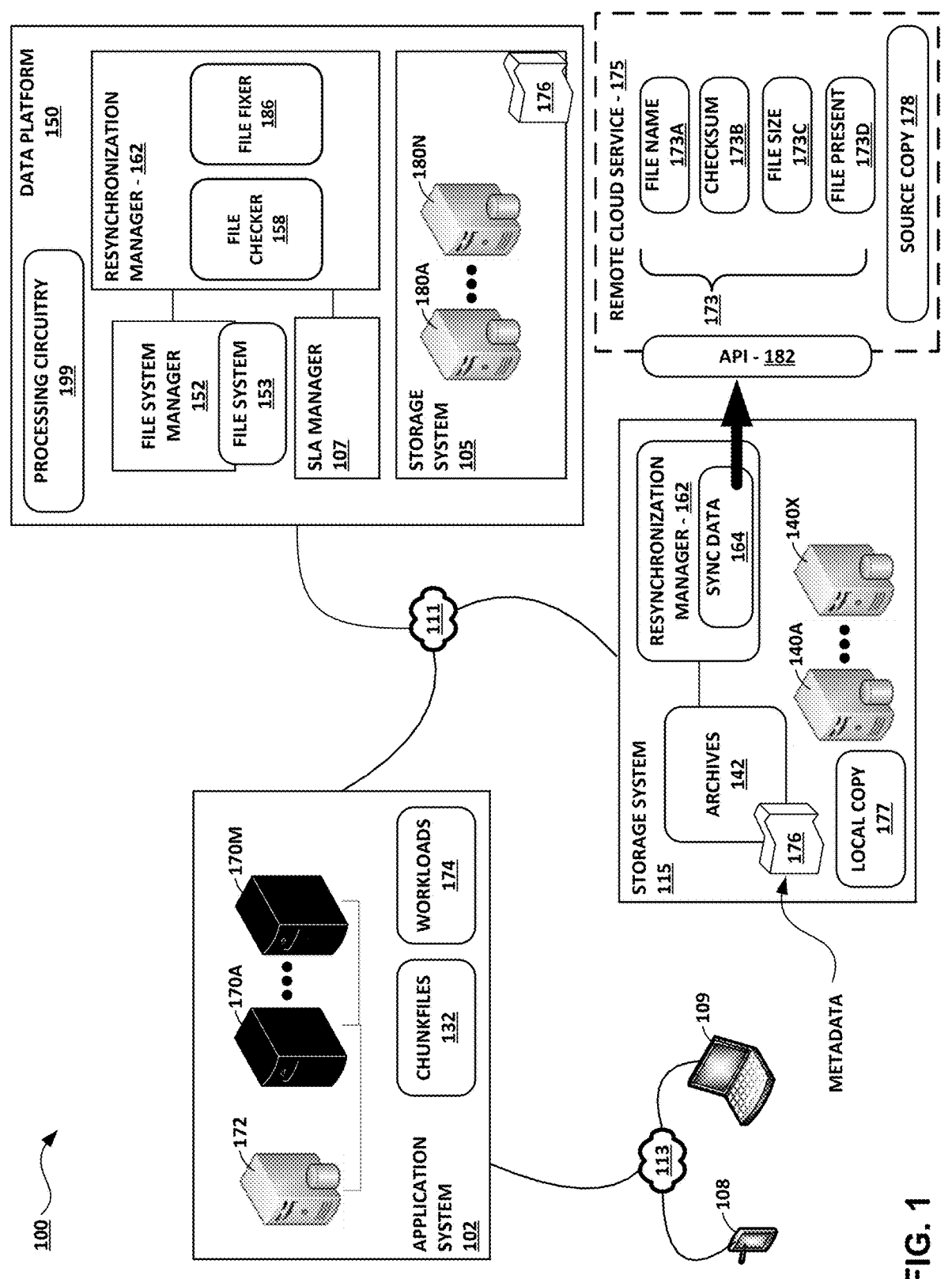
FIG. 1 is a block diagram illustrating example systems configured to optimize data reconciliation between cloud networks, in accordance with one or more techniques of the present disclosure.

In the context of a data platform storing a local copy of data which is hosted by a remote cloud service having a source copy, there is a need to keep both the local copy synchronized with the source copy stored by the remote cloud service. Consider for instance, a large email database for an organization hosted by the remote cloud service. It may be desirable for a local copy of the data to be stored locally by a data platform, notwithstanding the local copy being non-authoritative. The local copy may enable, for example, faster local access, reduced bandwidth consumption from the remote cloud service and thus lower financial costs, and localized analysis and reporting without necessitating access to the source copy hosted by the remote cloud service.

Changes to the source copy (e.g., new emails, deleted emails, modified files, etc.) may result in an out-of-sync condition between the source copy hosted by the remote cloud service and the local copy of the data at the data platform. An incremental backup may enable bringing the local copy of the data back into sync with the source copy hosted by the remote cloud service.

However, incremental backups may not always succeed. In some cases, a request for an incremental backup (e.g., an incremental download, partial download, or a resynchronization without a full download) cannot complete satisfactorily due to, for example, bugs or errors at the remote cloud service, internal bugs at a local data platform, source side errors originating from the remote cloud service such as a Re-Sync Required flag being set intentionally or erroneously, expired Graph Delta links, and so forth. Regardless of the root cause, such problems disrupt the ability of a data platform.

In such circumstances, the remote cloud service may instruct the data platform to perform a full backup or a full download of the data from the source copy hosted by the remote cloud service so as to bring the local copy of the data back into synchronization with the source copy. Conducting a full backup may result in a large and significant amount of data to be downloaded. Such large downloads may disturb the regular service level agreements (SLAs) for other tasks and add significant computational and Input/Output (IO) loads on the backup system. The necessity to perform a full backup may have additional consequences, such as inducing excessive latency for user and system access to the out-of-sync data as well as potentially triggering a throttling condition by the remote cloud service for data transmitted to the data platform, potentially further degrading performance characteristics of the data platform.

Similarly downloading all metadata, especially permissions metadata, is costly and may not be permissible by the remote cloud service during initial onboarding. Therefore, described herein are techniques for optimizing data reconciliation between cloud networks reduce the resource costs, time, and risk of throttling by avoiding full data downloads.

For instance, to reduce time and to preserve network bandwidth availability, optimizing data reconciliation between cloud networks may include, by way of example, discarding graph delta links to trigger a pull of every data item present within a source copy of the data hosted by a remote cloud service. Optimization operations may further include performing checks (e.g., via a file checker) locally on the data platform side to determine what data can be reused. The file checker operations may significantly reduce the amount of data that needs to be fully downloaded from the source copy hosted by the remote cloud service by identifying at least some portion or subset of the local copy of the data which may be reused (e.g., retained at the local copy without re-downloading from the source copy) by the data platform. A file fixer may then download the portion of the local copy of the data which is out-of-sync with the source copy hosted by the remote cloud service. For instance, rather than performing a full backup or full download of all of the data within the source copy, the file fixer may specify some subset to be downloaded, such as a list of files, a sub-directory, a chunk, etc., without necessitating download of the entirety of the data from the source copy hosted by the remote cloud service. In some examples, a file checker checks for file presence status, such as files that have been deleted or moved, and cleans up older files at the local copy for which the source copy indicates, via the file presence status, that such files are no longer present in a given location.

Such optimization operations enable a fully reconciled local copy of the data with the source copy of the data to be established faster, with less financial cost, with inducing less latency within the data platform, and with possibly significantly less bandwidth consumption.

The same approach may also be used to rehydrate/capture metadata to sync a local copy of the metadata with a source for the metadata.

FIG. 1 is a block diagram illustrating an example system that optimizes data reconciliation between cloud networks may include, in accordance with one or more techniques of the present disclosure. In the example of FIG. 1, a system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, healthcare software, or other types of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, healthcare software, or other types of applications. Enterprise applications may be delivered as a service from external cloud service providers or other providers, executed natively on application system 102, or both. The external cloud service provider may represent a third-party service provider that is separate from clients operating mobile device 108 and/or computing device 109.

In the example of FIG. 1, system 100 includes a data platform 150 that provides a file system 153 and backup or archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON® Simple Storage Service (S3®). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual computer and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system.

In some examples, one or more of storage devices 180 are both compute and storage devices that execute software for data platform 150, such as file system manager 152 and data protection manager 154 in the example of system 100. In some examples, separate compute devices (not shown) execute software for data platform 150, such as file system manager 152, SLA manager 107 (e.g., service level agreement manager) and resynchronization manager 162 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Archives 142 or snapshots created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 111 or network 113 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/ storage devices or systems). System 100 illustrated in FIG. 1 may be operatively coupled to network 111 and/or network 113 using one or more network links. The links coupling such devices or systems to network 111 and/or network 113 may be Ethernet, Asynchronous Transfer Mode (ATM) or other types of network connections, and such connections may be wireless and/or wired connections. One or more of the devices or systems illustrated in FIG. 1 or otherwise on network 111 and/or network 113 may be in a local location and/or a remote location relative to one or more other illustrated devices or systems. For instance, remote cloud service 175 may be communicably and operatively coupled to network 111 and/or network 113 using one or more network links.

Application system 102, using file system 152 provided by data platform 150, generates objects and other data that file system manager 152 creates, manages, and causes to be stored to storage system 105. For this reason, application system 102 may alternatively be referred to as a "source system" (which may be provided by a third-party such as remote cloud service 175 and as such may represent a "third-party service provider" or a "remote cloud service" 175 as depicted here) and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. In certain cases, remote cloud service 175 may provide a source copy 178 of data representing an authoritative copy of such data with local copy 177 stored by storage system 115 representing a local copy of the same data, but in a non-authoritative manner. In such a way, changes to source copy 178 take priority over any conflicts present within local copy 177. Changes may be made to source copy 178 and propagated to local copy 177. In some examples, changes are not permitted to local copy 177 and no changes may be propagated from local copy 177 to source copy 178. In other examples, changes are permitted to local copy 177 and may be propagated to 178 in the absence of any conflict. Where a conflict exists between local copy 177 and source copy 178, the source copy 178 operates as the authoritative copy and therefore, all conflicts are resolved in the favor of source copy 178.

File system manager 152 generates and stores metadata 176 to storage system 105. The collection of data stored to storage system 105 and used to implement file system 153 is referred to herein as file system data. File system data may include the aforementioned metadata 176 and objects. Metadata 176 may include file system objects, tables, trees, or other data structures; metadata 176 generated to support deduplication; or metadata to support archives 142 and snapshots. As shown in the example of FIG. 1 for instance, storage system 105 may store metadata for file system 153 in a tree data structure. Objects that are stored may include files, virtual machines, databases, applications, pods, containers, any of workloads 174, system images, directory information, or other types of objects used by application system 102. Objects of different types and objects of the same type may be deduplicated with respect to one another.

Data platform 150 includes SLA manager 107 that provides monitoring and enforcement of SLAs for file system 153 and workloads 174, including, for example, performing various analytical and statistics collection tasks, garbage collection tasks, data re-synchronization tasks, data backup tasks, data duplication and de-duplication tasks, etc. Data platform 150 additionally includes resynchronization manager 162 having both a file checker 158 and a file fixer 186. Resynchronization manager 162 enables synchronization tasks between data of local copy 177 with source copy 178. File checker 158 may determine whether files, data, or objects within local copy 177 are up-to-date and synchronized with source copy 178 hosted by remote cloud service 175. For instance, file checker 158 may compare local metadata 176 at storage system 115 with remote metadata 176 obtained from remote cloud service 175. In such examples, file checker 158 may determine sync data 164 to be obtained from remote cloud service 175 by evaluating file characteristics 173. For example, file checker 158 may evaluate file characteristics 173 including file name 173A, checksum 173B, file size 173C, and file present 173D status (elements 173A, 173B, 173C, and 173D are referred to collectively as file characteristics 173) as obtained from or reported by remote cloud service 175. File characteristics 173 obtained from remote cloud service 175 may be compared with corresponding characteristics 173 within metadata 176 describing local copy 177 to determine whether subsets, files, objects, or other portions of local copy 177 match source copy 178.

In the example of system 100, file system 153 stores one or more backups, archives, and/or snapshots 142 of file system data, stored by storage system 105, to storage system 115 via network 111. Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include a redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for snapshots 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115.

Data platform 150 that supports application system 102 relies on primary storage system 105 to support latency sensitive applications. However, because storage system 105 is often more difficult or expensive to scale, data platform 150 may use secondary storage system 115 to support secondary use cases such as backup, snapshot, archive, and/or other data platform services. In general, a file system backup, snapshot, or archive 142 is a copy of file system 153 to support protection of file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

File system manager 152 may enable enforcement of SLAs managed by SLA manager 107, for instance, to schedule and perform backups of file system data for file system 153 at any time in accordance with backup policies managed by SLA manager 107 that specify, for example, backup periodicity and timing (daily, weekly, etc.), which file system data is to be backed up, a backup retention period, storage location, access control, and so forth. An initial backup of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of source copy 178 hosted by remote cloud service 175 or one or more selected objects, files, directories, accounts, profiles, drives, portion or subset of the data within source copy 178.

One or more subsequent incremental backups of source copy 178 may correspond to respective states of source copy 178 at respective subsequent backup creation times, i.e., after the backup creation time corresponding to the initial backup. A subsequent backup may include an incremental backup of source copy 178. A subsequent backup may correspond to an incremental backup of one or more objects of source copy 178. Some of the file system data for file system 153 and/or source copy 178 stored on storage system 105 at an initial backup creation time may also be stored on storage system 105 at the subsequent backup creation times. A subsequent incremental backup of file system data for file system 153 and/or source copy 178 hosted by remote cloud service 175 may include data that was not previously stored in a backup at storage system 115. Data that is included in a subsequent backup of source copy 178 may be deduplicated by file system manager 152 against data that is included in one or more previous backups, including the initial backup, to reduce the amount of storage used. For example, if a file or object is deleted from source copy 178 hosted by remote cloud service 175 then a corresponding copy of the deleted copy will likewise be removed from local copy 177 via deduplication operations and/or resynchronization operations performed by file fixer 186 of resynchronization manager 162. Reference to a "time" in this disclosure may refer to dates and/or times. Times may be associated with dates. Multiple backups may occur at different times on the same date, for instance.

In system 100, file system manager 152 stores backups of file system data to storage system 115 as snapshots or archives 142, using chunkfiles 132. File system manager 152 may use any of snapshots or archives 142 to subsequently restore the file system (or portion thereof) to its state at the snapshot creation time, or the snapshot may be used to create or present a new file system (or "view") based on the snapshot, for instance. In other circumstances, file system manager 152 may defer to resynchronization operations performed by resynchronization manager 162, in which case, file fixer 186 may "restore" a file within local copy 177 of storage system 115 by re-downloading the file from source copy 178 hosted by remote cloud service 175 in the event such a file is determined by file checker 158 to be missing or out-of-sync.

As noted above, file system manager 152 may deduplicate file system data included in a subsequent snapshot or archive 142 against file system data that is included in one or more previous snapshots or archives 142. For example, a second object of file system 153 included in a second snapshot may be deduplicated against a first object of file system 153 and included in a first, earlier snapshot. File system manager 152 may remove a data chunk ("chunk") of the second object and generate metadata 176 with a reference (e.g., a pointer) to a stored chunk in one of chunkfiles 132. The stored chunk in this example is an instance of a chunk stored for the first object.

Data platform 150 may integrate with third-party services, including remote cloud service 175, such as document management services, text messaging services, data storage services, security services, etc. An example of these third-party services may include Microsoft 365™ (also known as M365), Gsuite™ by Google LLC, Amazon Web Services (AWS) from Amazon, Inc., etc. These third-party services may store data on behalf of the customer for data platform 150 that manages backup and archiving of the underlying data stored by the third-party service. When subscribing to the data platform services, a representative of data platform 150 may interface with the third-party services to better understand how much data is generated and/or stored by the third-party service, which often results in an estimate (including a cost) for data storage on which the customer data platform services (e.g., archive and/or backup) are based.

Data backups between cloud providers involve managing and synchronizing data across different platforms. The process starts with identifying the data source, such as M365, where the primary or source copy of the data resides (e.g., source data including services like Exchange Online, Share-Point Online, and OneDrive for Business). The backup target, such as data platform 150, stores the secondary copy of the data. Specialized backup tools or services, which may be offered by either the cloud providers or third-party vendors, are used to perform regular backups. These tools often utilize APIs, such as Microsoft Graph API, to access and manage the data. Scheduled backups, which can be daily, weekly, or real-time, are performed, with incremental backups capturing only changes since the last backup to optimize efficiency. Data is extracted from M365 and transferred securely to the backup target of data platform 150 using protocols that ensure data integrity and security. Verification processes, including integrity checks and restoration testing, confirm the successful transfer and usability of the backup data. Retention policies determine how long backups are kept, which is important for compliance and recovery. Continuous monitoring ensures proper backup operation and timely issue resolution. Additionally, encryption protects data during transit and at rest, adhering to regulatory and organizational standards for data protection and privacy. Overall, this process involves utilizing APIs, backup tools, and management practices to securely and accurately back up data from M365 to the secondary cloud provider.

Unfortunately, when utilizing the default APIs and backup tools, the remote cloud platform, such as M365, having the source copy of the data may reject a request to perform an incremental backup or a partial backup, and instead, provide an instruction to conduct a full backup, which due to the large volume of data, may trigger data throttling by the remote cloud platform, as well as inducing additional cost and latency. However, data platform 150 may, utilizing the APIs provided by the remote cloud platform, specify specific files, subsets, or portions of data. This enables data platform 150 to circumvent the instruction to perform a full download, while still attaining full synchronization.

In accordance with various aspects of the techniques described in this disclosure, data platform 150 may include resynchronization manager 162 to manage data discrepancies determined between local copy 177 stored locally to storage system 177 and source copy 178 hosted by remote cloud service 175. For instance, resynchronization manager 162 may interface with remote cloud service 175 via an application programming interface—shown as API(s) 182—exposed by the third-party service) to obtain metadata describing data storage maintained by the third-party service as source copy 178. Such metadata 176 may identify various file characteristics 173 such as file name 173A, checksum 173B, file size 173C, file present 173D status, a particular type of file or object, e.g., number of documents, text messages, etc., along with a total amount of data stored, and an amount of time, such as days, weeks, months, etc. such data is stored by the third-party service), and the like.

Resynchronization manager 162 may execute a series of algorithms, which may involve an artificial intelligence and/or machine learning model, to predict the number of different files, objects, or data subsets to be synchronized from source copy 178 to local copy 177, considering factors such as costs, compliance with SLA manager 107 policies, and timing. For instance, resynchronization manager 162 may determine a total time required for the initial full backup, often referred to as onboarding time, and evaluate whether a solution can meet the customer's service level agreement (SLA), such as specifying backups every 12 hours, 24 hours, 48 hours, etc.).

Additionally, resynchronization manager 162 may enable planning clusters, including their size, to support data platform services, as well as planning capacity for a self-managed solution for instances where data platform 150 is hosted by the customer. In some cases, resynchronization manager 162 may identify execution pathways and/or backup plans to expedite the backup process and compute or predict additional costs associated with retrieving data from a third-party service. For example, resynchronization manager 162 may optimize reconciliation between cloud networks to reduce resource costs, time, and the risk of throttling by avoiding full data downloads. This could involve identifying portions of data within local copy 177 that may be reused or retained without re-downloading from source copy 178. The portion of data within local copy 177 that can be reused or retained without re-downloading from source copy 178 may be determined by resynchronization manager 162 based on a comparison of local metadata 176 with the corresponding metadata or file characteristics obtained from remote cloud service 175 for the respective data portions provided by source copy 178.

In operation, resynchronization manager 162 may obtain metadata 176 indicative of data stored by remote cloud service 175, which functions as a third-party service provider for a (potential or existing) client of data platform 150. Resynchronization manager 162 may execute a series of API calls to invoke various functions of API(s) 182 for retrieving metadata 176 from remote cloud service 175. API(s) 182 associated with remote cloud service 175 may enable resynchronization manager 162 to manage third-party services provided by remote cloud service 175 and retrieve metadata 176. Resynchronization manager 162 may require the client to enter authentication information (e.g., username and password, multi-factor authentication (MFA) information, security keys, etc.) to access the client account used for authenticating the client with respect to the third-party service provider.

Resynchronization manager 162 may train and utilize one or more machine learning (ML) models, one or more statistical models, one or more artificial intelligence (AI) models, and/or one or more pre-trained ML models that have been trained on training data and/or client data (e.g., data stored by the third-party service provider on behalf of the client and/or metadata 176).

Artificial intelligence (AI) generally refers to methods by which autonomous devices operate to make decisions responsive to changing observed states. AI models may utilize machine learning (ML), which typically involves training a machine learning model with training data to produce a trained model capable of generalizing properties of data based on similar patterns found in the training data. Training the model may involve learning model parameters by optimizing an objective function, thereby increasing the likelihood of observing the training data given the model. File checker 158 may incorporate such AI models and/or ML models specifically trained to determine whether files, objects, or other data within local copy 177 are out-of-sync with source copy 178.

AI and ML models may include any number of different types of machine learning models, such as neural networks, deep neural networks, dense neural networks, and the like. Although described with respect to machine learning models, the techniques described in this disclosure are also applicable to other types of AI models, including rule-based models, finite state machines, and the like.

Machine learning may generally enable a computing device to analyze input data and identify an action to be performed responsive to the input data. Each machine learning model may be trained using training data that reflects likely input data. The training data may be labeled or unlabeled (meaning that the correct action to be taken based on a sample of training data is explicitly stated or not explicitly stated, respectively).

The training of the machine learning model may be guided (in that a designer, such as a computer programmer, may direct the training to guide the machine learning model to identify the correct action in view of the input data, where guided may be referred to as supervised) or unguided (in that the machine learning model is not guided by a designer to identify the correct action in view of the input data, where unguided may be referred to as unsupervised). In some instances, the machine learning model is trained through a combination of labeled and unlabeled training data, a combination of guided and unguided training, or possibly combinations thereof. Examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there is limited training data that may not or may not fully address the wider variability of the input data. Further, a potential benefit of machine learning models is to avoid exhaustive and time-consuming comprehensive training but still produce a machine learning model that performs accurate action (which is another way of referring to a "decision") identification through limited sampled training.

In some examples, data platform 150 stores archives 142 using chunkfiles 162 stored to storage system 115 that resides on premises or, in other words, local to data platform 150. Stated differently, resynchronization manager 162 may optionally utilize local storage system 105 including local copy 177 and meta data 176 when invoking API 182 calls into remote cloud service 175 in the manner described above in the context of FIG. 1, however, without local copy 177 and meta data 176 needing to be stored by separate storage system 115.

Figure 2:
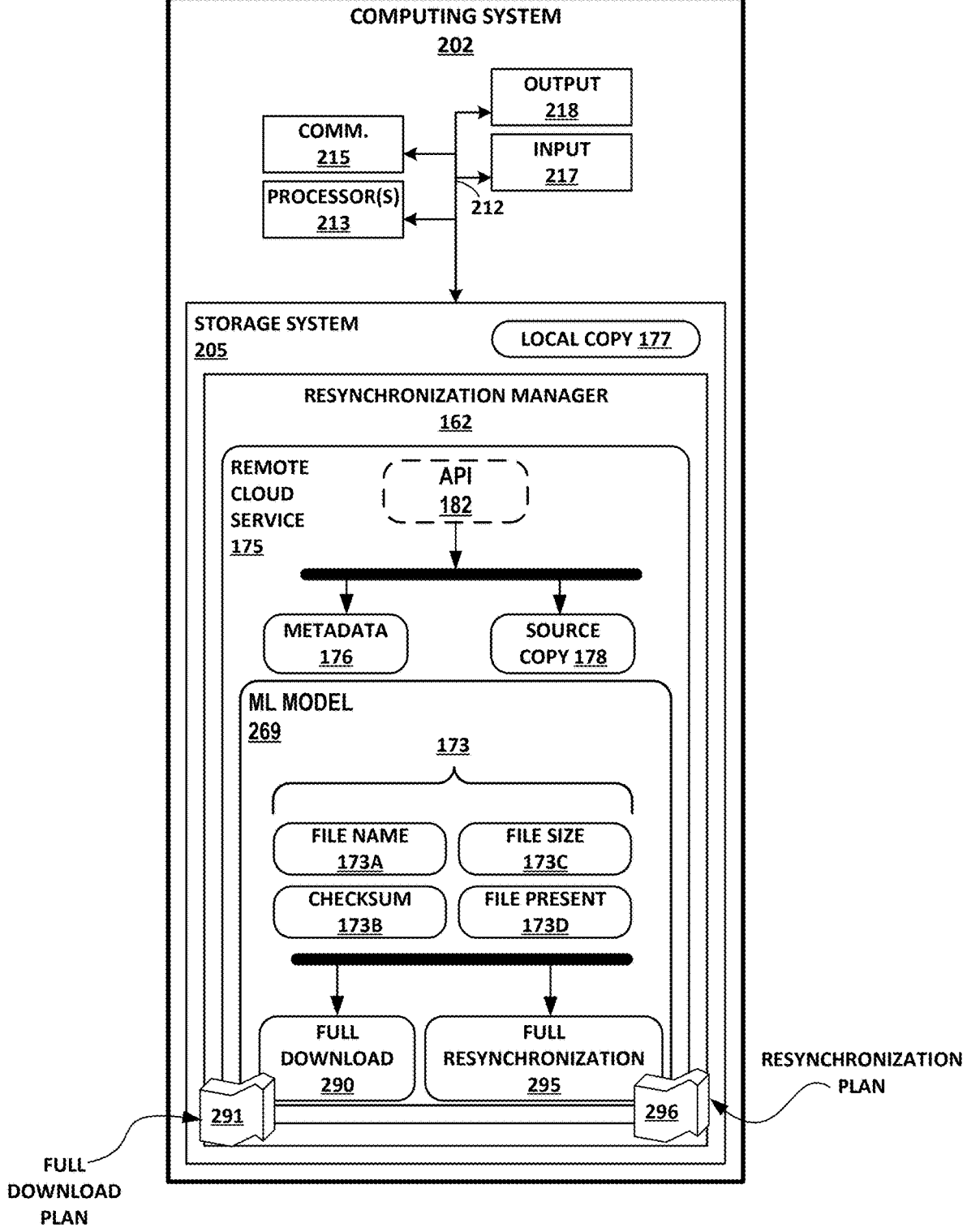
FIG. 2 is a block diagram illustrating an example of a computing system configured to execute functions of a resynchronization manager of FIG. 1, in accordance with techniques of this disclosure.

FIG. 2 is a block diagram illustrating an example of a computing system configured to execute functions of resynchronization manager 162 of FIG. 1, in accordance with techniques of this disclosure. Computing system 202 of FIG. 2 may represent an example of a computing device that supports execution of data platform 150 and may be described in the context of system 100 of FIG. 1.

While described with respect to a computing device that supports execution of data platform 150, computing device 202 may represent a computing device of the client requesting data platform 150 provide data platform services with respect to data stored by the third-party remote cloud service 175. In the context of a computing device of the client, computing device 202 may download software provided by remote cloud service 175, such as M365 or AWS. Computing device 202 of the client may execute the downloaded software (e.g., execute M365 or AWS software) to enable interaction with such remote cloud services 175, for instance, via API 182.

M365 stands for Microsoft 365, a suite of productivity and collaboration tools developed by Microsoft. M365 integrates several Microsoft services and applications into a unified platform and includes well-known applications such as Word, Excel, PowerPoint, and Outlook, alongside cloud-based services like OneDrive for file storage and SharePoint for collaboration and document management. Additionally, M365 provides access to Teams, which facilitates communication and collaboration through chat, video meetings, and file sharing. Notably, an M365 based remote cloud service 175 may store the authoritative source copy 178 and meta-data 176, notwithstanding storage system 205 of computing device 202 storing local copy 177 of source data 178 managed by M365.

AWS stands for Amazon Web Services and provides a comprehensive cloud computing platform provided by Amazon and offers a broad range of services, including computing power, data storage, and databases, as well as machine learning, analytics, and additional functionalities. These services are designed to enable businesses to scale and grow without the need for investing in physical hardware and infrastructure. As with M365, an AWS based remote cloud service 175 may store the authoritative source copy 178 and metadata 176, notwithstanding storage system 205 of computing device 202 storing local copy 177 of source data 178 managed by AWS.

Microsoft 365 operates on a subscription model basis, offering various plans tailored for different needs, including personal, business, and educational use. AWS operates on a pay-as-you-go model, meaning users pay solely for the services utilized. Consequently, very large downloads from either M365 or AWS, such as conducting full download 290 (e.g., during on-boarding or when a full resynchronization 295 cannot be completed) may incur significant financial and computational costs which. Resynchronization plan 296 may therefore enable the same end result as full download plan 291, without downloading the entirety of source copy 178, thus reducing the financial cost, computational cost, and time needed to complete full resynchronization 295.

In the example of FIG. 2, computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 205 ("storage system 205"). One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input device of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 205 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 205 may store instructions and/or data of one or more modules. The combination of processors 213 and local storage system 205 may retrieve, store, and/or execute the instructions and/or data of one or more applications, modules, or software. Processors 213 and/or storage devices of local storage system 205 may also be operably coupled to one or more other software and/or hardware components, including, but not limited to, one or more of the components of computing system 202 and/or one or more devices or systems illustrated as being connected to computing system 202.

In the example of M365 and similar workloads, there have been challenges with maintaining full synchronization 295 for customers. As discussed above, server side errors, bugs, throttling by remote cloud service 175, and other issues may result in excessive cost to the customer, excessive access latency and delay to the customer, or potentially out-of-sync data within local copy 177 when compared with source copy 178.

Moreover, resynchronization manager 162 may request an incremental backup (e.g., a partial backup) in compliance with a customer SLA, and yet, receive an instruction back from remote cloud service 175 instructing resynchronization manager 162 (or any entity requesting the incremental backup via API 182) to execute full download plan 291 to achieve full download 290 rather than the requested incremental backup. Machine Learning Model 269 (ML Model 269) may therefore construct a synchronization plan 296 to establish a full resynchronization 295, responsive to encountering such errors or responsive to receiving or otherwise obtaining instructions from remote cloud service 175 to execute full download plan 291.

For instance, in response to receiving instruction from remote cloud service 175 to execute full download plan 291, ML model 269 may instead determine that a first subset of the local copy 177 stored via storage system 205 satisfies one or more validity checks and determine that a second subset of local copy 177 via storage system 205 is out-of-sync with source copy 178 at remote cloud service 175 based on the one or more validity checks. In such an example, resynchronization manager 162 may responsively initiate a full download of only the second subset of local copy 177 from remote cloud service 175 pursuant to resynchronization plan 296 to achieve full synchronization 295 with remote cloud service 175 without conducting full download plan 291 (e.g., without performing full download 290), even when expressly instructed by remote cloud service 175 to conduct full download 290 or to execute full download plan 291.

In such an example, resynchronization manager 162 may coordinate with ML model 269 to establish resynchronization plan 296 based on remote metadata attributes and/or file characteristics 173 including file name 173A, checksum 173B, file size 173C, and file present 173D status.

In certain examples, resynchronization manager 162 determines that resynchronization of local copy 177 from source copy 178 is incomplete or as noted above, may receive an instruction the remote cloud service 175 to perform full download 290 of the data to resynchronize local copy 177 of the data with source copy 178 stored by remote cloud service 175. Regardless of the manner in which resynchronization manager 162 determines that resynchronization is incomplete (e.g., pursuant to requesting a partial or incremental backup), resynchronization manager 162 may be configured to download in full, a second subset of the data without downloading any portion of the first subset of the data that satisfies the one or more validity checks. Stated differently, resynchronization manager 162 may determine which files or portion of local copy 177 is valid and which portion of local copy 177 is not valid, and responsively download only the invalid portion of local copy 177 pursuant to resynchronization plan 296 to attain full resynchronization 295 using ML model 269.

According to certain examples, resynchronization manager 162 may further evaluate conditions other than file characteristics 173, such as selection of license type provided by remote cloud service 175, whether user-based or capacity-based constraints may affect download costs, time, or SLA commitments, whether such conditions warrant a change to the type and/or number of licenses to be acquired from remote cloud service 175, or other conditions which may negatively or positively affect the customer's cost, time, latency, compliance with SLA commitments, etc. Additionally, resynchronization manager 162 may assess the total time required for the initial full backups, known as onboarding time, in which case it simply is not possible to execute resynchronization plan 296, as local copy 177 would have no portion of source copy 178 during onboarding. Resynchronization manager 162 may also predict, using ML model 269, whether resynchronization plan 296 solution can meet Service Level Agreements (SLAs) for backups as specified by a customer, such as customer specified time periods of every 12 hours, 24 hours, 48 hours, 1-week, monthly, quarterly, or longer. Further still, resynchronization manager 162 may consider any additional charges for paid API services from the M365 and/or AWS services provided by remote cloud service 175.

In certain examples, resynchronization manager 162 may invoke a series of API calls pursuant to resynchronization plan 296. For instance, resynchronization plan 296 may invoke various functions of API(s) 182 for retrieving metadata 176 from the third-party service provider upon which to evaluate file characteristics 173 including file name 173A, checksum 173B, file size 173C, and file present 173D status to enable the generation of resynchronization plan 296 via ML model 269. API(s) 182 for remote cloud service 175 may allow the client to manage the third-party services and retrieve metadata 176, a full download 290, or specify portions of source copy 178 or specific files from source copy 178. Resynchronization manager 162 may request the client to enter authentication information (e.g., username and password, multi-factor authentication—MFA—information, security keys, etc.) in order to access the client account used for authenticating the client with respect to remote cloud service 175.

An example is described below with respect to M365. While described with respect to M365, various aspects of the techniques may apply to any remote cloud service 175 in which data storage and resynchronization needs to be accurately determined to minimize, where feasible, costs incurred for the customer from remote cloud service 175 as well as set customer expectations in terms of computational load, data access latency, and so forth.

Data collection from the M365 source involves several steps. Modules such as Microsoft.Graph.Reports, Microsoft.Graph.Groups, and ExchangeOnlineManagement may need to be downloaded if not already available. Connection to the M365 source copy 178 may be established with permissions including "Reports.Read.All," "User.Read.All," "Group.Read.All," and/or "Sites.Read.All," all of which are for reading data only. No modifications will be made to source copy 178.

Data for each M365 workload is collected through a step-by-step process. For OneDrive, resynchronization plan 296 may utilize APIs such as getOneDriveUsageAccountDetail and getOneDriveUsageStorage. These APIs, which are examples of APIs 182, return data about the availability of OneDrives in the source. Resynchronization plan 296 may obtain details about the number of files in each OneDrive, as well as the amount of storage available and used. Additionally, resynchronization plan 296 may retrieve the owner's name and the associated site URL, if applicable. Data about storage usage for specific days or periods, such as 7, 30, 90, and 180 days, may also be collected. Although M365 allows data retrieval for a maximum of 180 days, this data may be extrapolated to predict usage for the next 6 months or even a year by ML model 269 for the purposes of cost projections and predicting which of multiple subscription plans are most cost-effective for a given customer.

For SharePoint, resynchronization plan 296 may invoke APIs such as getSharePointSiteUsageDetail and getSharePointSiteUsageStorage. Similar to OneDrive, resynchronization plan 296 may gather details about all sites, including storage used and file counts. Resynchronization plan 296 may also collect information on the number of pages viewed across all sites. This information enables ML model 269 to predict usage trends for SharePoint sites.

For mailboxes, resynchronization plan 296 may use APIs such as getMailboxUsageDetail and getMailboxUsageStorage to obtain storage details, item counts, and activity details. Additionally, resynchronization plan 296 may retrieve data about Exchange Online, including the number of instances for each type of mailbox, such as shared mailbox, room mailbox, and user mailbox. Based on this data, ML model 269 may suggest different types of licensing according to the mailbox types that need to be backed up.

For groups, resynchronization plan 296 may invoke the Get-MgGroup API to retrieve all groups within the M365 source. This API 182 returns all groups belonging to the M365 source. Resynchronization plan 296 may obtain information such as group visibility, whether the group is deleted, and expiry time for the group. ML Model 269 may use this information to adjust the backup strategy carried out by the execution of resynchronization plan 296, including prioritizing backups for groups that are about to be permanently deleted. The backup algorithm may help set a priority order to minimize data loss, given that group backups require time.

Teams, which have additional application integrations and whose membership is maintained in Groups, presents a challenge. Due to the various types of data in Teams, resynchronization plan 296 may need to execute a more comprehensive backup under a single process. APIs such as getTeamsTeamActivityDetail and getTeamsUserActivityUserDetail may be used for full backup coverage and optimized performance. Beyond these workloads, resynchronization plan 296 may also collect Azure AD level reports to gather metrics, such as the number of active users and the workloads enabled for each user. ML model 269 may also retrieve multi-geographical data to determine optimal locations for storing data backups.

After collecting metadata 176, which includes any of the various types of data listed above, ML model 269 may utilize the metadata 176 to determine file characteristics 173 when creating resynchronization plan 296. ML model 269 may store metadata 176 in storage system 105 (see, e.g., FIG. 1). Metadata 176 may encompass a wide range of file characteristics 173 beyond those described above, including one or more of the following: the number of objects stored for each account supported by remote cloud service 175 for the client of data platform 150; the amount of storage available for each of these accounts; the frequency of object storage for each account; the number of sites provided by remote cloud service 175 that store data on behalf of the client; the location of these sites; the cost of providing data storage for the objects by remote cloud service 175; the number of active accounts; and the number of active workloads per each active account, etc. In some examples, ML model 269 is configured to process metadata 176 indicative of the storage of the data by remote cloud service 175 to obtain costs for providing data platform services by data platform 150 for the data stored by the third-party service. ML model 269 may include a machine learning (ML) model 169 configured to process metadata 176 or statistically extrapolated versions of metadata 176, for instance, based on reports generated through application of ML model 269 or returned by remote cloud service 175.

ML model 269 may represent one or more statistical models, one or more artificial intelligence (AI) models, and/or one or more ML models trained on training data and/or the client data (e.g., the data stored by remote cloud service 175 on behalf of the client and/or metadata 176). There are a number of different statistical models, including a seasonal autoregressive integrated moving average (SARIMA) model, an autoregressive moving average (ARMA) model, a moving average (MA) model or any other time series model.

As noted above, AI models include neural networks, such as feedforward neural networks, recurrent neural networks (e.g., long short term memory—LSTM), convolutional neural networks, etc. For instance, ML model 269 may first apply the SARIMA model to the metadata 176 to extrapolate metadata 176 and then invoke the LSTM to process extrapolated metadata 176' (e.g., metadata-prime, where the prime notation denotes modification of metadata 176) and produce resynchronization plan 296. LSTM 267 may undergo active training over time and may be invoked periodically to provide additional estimates 167 that continue to improve over time. In any event, the LSTM may output resynchronization plan 296 for execution against remote cloud service 175.

Referring back to the example of M365, ML model 269 may analyze the licensing model applicable to a customer for remote cloud service 175. Using the collected data, ML model 269 may calculate the total number of objects to be backed up, the average storage consumption per object, the average storage consumption per user, and daily growth. Based on these parameters, ML model 269 may customize resynchronization plan 296 for a specific customer. In certain examples, ML model 269 may generate and output a recommendation for the customer indicating that, for example, changing to a consumption-based plan or changing to a user-based licensing model would be more cost-effective.

For example, ML model 269 may evaluate consumption-based licensing and if the average storage consumption per object is less than 10 GB or more than 50 GB, and the total number of objects is fewer than 5000, then ML model 269 may output a recommendation for consumption-based licensing. For user-based licensing, ML model 269 may evaluate if the average storage consumption per object is more than 10 GB and less than 50 GB, and if so, then ML model 269 may output a recommendation for user-based licensing. Additionally, if the total number of objects exceeds 5000, ML model 269 may output a recommendation for user-based licensing.

In the case of an initial backup (e.g., during customer onboarding), ML model 269 may evaluate the time required for the initial backup. For instance, ML model 269 may compute the minimum and maximum days required to onboard, based on the number of API calls needed and the daily API limits imposed by M365. ML model 269 may then generate resynchronization plan 296 based on these values. For a previously deployed local copy 177, ML model 269 may generate resynchronization plan 296 based on parameters which minimize cost, reduce latency, and meet a customer's previously specified SLA.

When permissible, ML model 269 may generate resynchronization plan 296 configured to purposefully split M365 backups across regions to enhance performance. For schedule optimization, ML model 269 may generate resynchronization plan 296 based on a backup window that both complies with a customer's SLA and minimizes IO and computational load during the customer's time zone.

ML model 269 may combine statistical and ML-based methods to predict future trends more accurately. This model may use organization-specific data and the region, organization domain, etc., as inputs to a SARIMA model and an LSTM model. Because forecasts deteriorate over longer periods ML model 269 may utilize an LSTM model designed to capture long-term dependencies in data. ML model 269 may then generate resynchronization plan 296 based on the analysis.

ML model 269 may be applied to various scenarios and generate resynchronization plan 296 for different remote cloud services 175. For instance, ML model 269 may use Microsoft Azure and M365 APIs to obtain statistics for disk storage, blob storage, and the number of VMs prior to generating and executing resynchronization plan 296. For AWS workloads, similar statistics may be gathered using AWS APIs prior to generating and executing resynchronization plan 296. For Google Cloud workloads, ML model 269 may use GCP APIs prior to generating and executing resynchronization plan 296. For other SaaS applications like Google Workspace, Salesforce, Slack, and Workday, data collection and analysis methods can be adapted with minor changes prior to generating and executing resynchronization plan 296.

FIG. 3 is a flowchart illustrating an example for rapidly reconciling copies of data across multiple cloud providers without the need for a complete data backup, in accordance with one or more techniques of the present disclosure.

As described above with respect to FIG. 1, resynchronization manager 162 may execute ML model 269, which may obtain metadata 176 indicative of data stored by a third-party service provider and/or remote cloud service 175 for a client of data platform 150. ML model 269 may generate a resynchronization plan 296 which, when executed, invokes commands at the remote cloud service 175 via API 182 to facilitate resynchronization plan 296 to carry out a partial backup to attain full synchronization 295, even when explicitly instructed by remote cloud service 175 to execute full download plan 291 to obtain full backup 290.

Data platform 150 may store a local copy of data corresponding to a remote source copy of the data (305). For example, processing circuitry of data platform 150 may store a local copy of data via the storage system of the data platform, wherein a remote cloud service stores a source copy of the data on a remote storage system of the remote cloud service.

Data platform 150 may initiate resynchronization of the local copy of the data with the source copy (310). For example, processing circuitry of data platform 150 may initiate a resynchronization of the local copy of the data stored by the storage system of the data platform with the source copy stored by the remote cloud service.

Data platform 150 may obtain an indication resynchronization is incomplete (315). For example, processing circuitry of data platform 150 may obtain an indication the resynchronization of the local copy of the data from the source copy is incomplete.

Data platform 150 may determine a first portion of the local copy of the data is valid (320). For example, processing circuitry of data platform 150 may determine that a first subset of the data stored via the storage system of the data platform satisfies one or more validity checks.

Data platform 150 may determine that a second portion of the local copy of the data is out-of-sync (325). For example, processing circuitry of data platform 150 may determine that a second subset of the data stored by the storage system of the data platform is out-of-sync with the source copy of the data at the remote cloud service based on the one or more validity checks.

Data platform 150 may fully download the second portion of the data (330). For example, processing circuitry of data platform 150 may initiate a full download of the second subset of the data to the storage system of the data platform from the remote cloud service. Notably, the full download of the second subset of the data may be performed pursuant to resynchronization plan 296 without downloading any portion of the first subset of the data stored via the storage system of the data platform that satisfies the one or more validity checks.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/ or firmware.

In this way, various aspects of the techniques may enable the following examples.

Example 1—A data platform comprising: processing circuitry; a storage system; non-transitory computer readable media; and wherein the instructions, when executed by the processing circuitry, configure the processing circuitry to: store, by the processing circuitry, a local copy of data via the storage system of the data platform, wherein a remote cloud service stores a source copy of the data on a remote storage system of the remote cloud service; initiate, by the processing circuitry, a resynchronization of the local copy of the data stored by the storage system of the data platform with the source copy stored by the remote cloud service; obtain, by the processing circuitry, an indication the resynchronization of the local copy of the data from the source copy is incomplete; determine, by the processing circuitry, that a first subset of the data stored via the storage system of the data platform satisfies one or more validity checks; determine, by the processing circuitry, that a second subset of the data stored via the storage system of the data platform is out-of-sync with the source copy of the data stored by the remote cloud service based on the one or more validity checks; and initiate, by the processing circuitry, a full download of the second subset of the data to the storage system of the data platform from the remote cloud service.

Example 2—The data platform of example 1, wherein the instructions, when executed, further configure the processing circuitry to: obtain remote metadata attributes for the data from the remote cloud service without downloading the data; determine local metadata attributes for the data stored via the storage system of the data platform; and validate the first subset of the data stored via the storage system of the data platform satisfies the one or more validity checks based on a comparison of the remote metadata attributes with the local metadata attributes for the data stored via the storage system of the data platform.

Example 3—The data platform of examples 1 or 2, wherein the instructions, when executed, further configure the processing circuitry to: obtain remote metadata attributes for the data from the remote cloud service without downloading the data; determine local metadata attributes for the data stored via the storage system of the data platform; and determine the second subset of the data stored via the storage system of the data platform is out-of-sync with the source copy of the data at the remote cloud service based on a comparison of the remote metadata attributes with the local metadata attributes for the data stored via the storage system of the data platform.

Example 4—The data platform of any one of examples 1-3, wherein the remote metadata attributes and the local metadata attributes describe one or more of: a file size of one or more files within the data; a checksum value of one or more files within the data; a file presence status or file deleted status of one or more files within the data; or a file name of one or more files within the data.

Example 5—The data platform of any one of examples 1-4: wherein to obtain the indication the resynchronization of the local copy of the data from the source copy is incomplete includes the instructions, when executed, to further configure the processing circuitry to receive an instruction from the remote cloud service to perform a full download of the data to resynchronize the local copy of the data with the source copy of the data stored by the remote cloud service; and wherein the instructions, when executed, further configure the processing circuitry to download in full the second subset of the data without download of the first subset of the data determined to satisfy the one or more validity checks.

Example 6—The data platform of any one of examples 1-5, wherein to obtain the indication the resynchronization of the local copy of the data from the source copy is incomplete includes the instructions, when executed, to further configure the processing circuitry to obtain at least one of: an indication from the remote cloud service that a determined data delta requires a full download of the data from the source copy of the data stored by the remote cloud service; an instruction from the remote cloud service to perform a full download of the source copy of the data from the remote cloud service; an indication from the remote cloud service that token or link configured to access the source copy of the data from the remote cloud service has expired; or an indication from the remote cloud service that a requested download of the data from the remote cloud service will be throttled.

Example 7—The data platform of any one of examples 1-6, wherein to obtain the indication the resynchronization of the local copy of the data from the source copy is incomplete includes the instructions, when executed, to further configure the processing circuitry to obtain at least one of: an error message from the remote cloud service; a determined latency for the resynchronization that satisfies a time-out threshold; a determined throttling condition at the remote cloud service affecting the resynchronization of the local copy of the data from the source copy of the data stored by the remote cloud service; a determined quantity of change operations on the data satisfies a maximum data-delta threshold; an elapsed time since the data was last fully downloaded from the source copy of the data stored by the remote cloud service satisfies a maximum incremental backup threshold; or a determined bandwidth consumption that satisfies a bandwidth threshold.

Example 8—The data platform of any one of examples 1-7, wherein the data comprises at least one of: a user mailbox stored by the remote cloud service; a file stored by the remote cloud service; a directory stored by the remote cloud service; a virtual drive stored by the remote cloud service; a user data repository stored by the remote cloud service; or an organization data repository stored by the remote cloud service.

Example 9—The data platform of any one of examples 1-8, wherein to initiate the resynchronization of the local copy of the data from the source copy stored by the remote cloud service includes the instructions, when executed, to further configure the processing circuitry to resynchronize the local copy of the data with the source copy stored by the remote cloud service without a full download of the data from the source copy stored by the remote cloud service.

Example 10—The data platform of any one of examples 1-9, wherein to initiate the resynchronization of the local copy of the data from the source copy stored by the remote cloud service includes the instructions, when executed, to further configure the processing circuitry to: initiate an incremental download of the local copy of the data from the source copy stored by the remote cloud service; or initiate a partial download of the local copy of the data from the source copy stored by the remote cloud service.

Example 11—A method comprising: storing a local copy of data via the storage system of the data platform, wherein a remote cloud service stores a source copy of the data on a remote storage system of the remote cloud service; initiating a resynchronization of the local copy of the data stored by the storage system of the data platform with the source copy stored by the remote cloud service; obtaining an indication the resynchronization of the local copy of the data from the source copy is incomplete; determining that a first subset of the data stored via the storage system of the data platform satisfies one or more validity checks; determining that a second subset of the data stored via the storage system of the data platform is out-of-sync with the source copy of the data stored by the remote cloud service based on the one or more validity checks; and initiating a full download of the second subset of the data to the storage system of the data platform from the remote cloud service.

Example 12—The method of example 11, further comprising: obtaining remote metadata attributes for the data from the remote cloud service without downloading the data; determining local metadata attributes for the data stored via the storage system of the data platform; and validating the first subset of the data stored via the storage system of the data platform satisfies the one or more validity checks based on a comparison of the remote metadata attributes with the local metadata attributes for the data stored via the storage system of the data platform.

Example 13—The method of examples 11 or 12, further comprising: obtaining remote metadata attributes for the data from the remote cloud service without downloading the data; determining local metadata attributes for the data stored via the storage system of the data platform; and determining the second subset of the data stored via the storage system of the data platform is out-of-sync with the source copy of the data at the remote cloud service based on a comparison of the remote metadata attributes with the local metadata attributes for the data stored via the storage system of the data platform.

Example 14—The method of examples 11 or 13, wherein the remote metadata attributes and the local metadata attributes describe one or more of: a file size of one or more files within the data; a checksum value of one or more files within the data; a file presence status or file deleted status of one or more files within the data; or a file name of one or more files within the data.

Example 15—The method of examples 11 or 14, further comprising: receiving an instruction from the remote cloud service to perform a full download of the data to resynchronize the local copy of the data with the source copy of the data stored by the remote cloud service; and downloading, in full, the second subset of the data without downloading the first subset of the data determined to satisfy the one or more validity checks.

Example 16—The method of examples 11 or 15, wherein obtaining the indication the resynchronization of the local copy of the data from the source copy is incomplete includes obtaining at least one of: receiving an indication from the remote cloud service that a determined data delta requires a full download of the data from the source copy of the data stored by the remote cloud service; receiving an instruction from the remote cloud service to perform a full download of the source copy of the data from the remote cloud service; receiving an indication from the remote cloud service that token or link configured to access the source copy of the data from the remote cloud service has expired; or receiving an indication from the remote cloud service that a requested download of the data from the remote cloud service will be throttled.

Example 17—The method of examples 11 or 16, wherein obtaining the indication the resynchronization of the local copy of the data from the source copy is incomplete includes at least one of: obtaining an error message from the remote cloud service; determining latency for the resynchronization satisfies a time-out threshold; determining a throttling condition at the remote cloud service is affecting the resynchronization of the local copy of the data from the source copy of the data stored by the remote cloud service; determining a quantity of change operations on the data satisfies a maximum data-delta threshold; determining an elapsed time since the data was last fully downloaded from the source copy of the data stored by the remote cloud service satisfies a maximum incremental backup threshold; or determining bandwidth consumption satisfies a bandwidth threshold.

Example 18—The method of examples 11 or 17, wherein the data comprises at least one of: a user mailbox stored by the remote cloud service; a file stored by the remote cloud service; a directory stored by the remote cloud service; a virtual drive stored by the remote cloud service; a user data repository stored by the remote cloud service; or an organization data repository stored by the remote cloud service.

Example 19—The method of examples 11 or 18, further comprising: synchronizing the local copy of the data with the source copy stored by the remote cloud service without a full download of the data from the source copy stored by the remote cloud service.

Example 20—Computer-readable storage media comprising instructions that, when executed, configure processing circuitry to: store a local copy of data via the storage system of the data platform, wherein a remote cloud service stores a source copy of the data on a remote storage system of the remote cloud service; initiate a resynchronization of the local copy of the data stored by the storage system of the data platform with the source copy stored by the remote cloud service; obtain an indication the resynchronization of the local copy of the data from the source copy is incomplete; determine that a first subset of the data stored via the storage system of the data platform satisfies one or more validity checks; determine that a second subset of the data stored via the storage system of the data platform is out-of-sync with the source copy of the data stored by the remote cloud service based on the one or more validity checks; and initiate a full download of the second subset of the data to the storage system of the data platform from the remote cloud service.

Example 21—An apparatus comprising means for performing any combination of techniques of examples 11-18.

What is claimed is:

1. A data platform comprising:
processing circuitry;
a storage system;
non-transitory computer readable media storing instructions; and
wherein the instructions, when executed by the processing circuitry, configure the processing circuitry to:
store, by the processing circuitry, a local copy of data via the storage system of the data platform, wherein a remote cloud service stores a source copy of the data on a remote storage system of the remote cloud service;
initiate, by the processing circuitry, a resynchronization of the local copy of the data stored by the storage system of the data platform with the source copy stored by the remote cloud service;
obtain, by the processing circuitry, an indication the resynchronization of the local copy of the data from the source copy is incomplete;
obtain, by the processing circuitry, remote metadata attributes from the remote cloud service that correspond to the data stored via the storage system without downloading file data content corresponding to the source copy of the data from the remote storage system;
compare, by the processing circuitry, the remote metadata attributes with corresponding local metadata attributes for the data stored via the storage system to determine a first subset of the data stored via the storage system of the data platform satisfies one or more validity checks;
determine, by the processing circuitry, that a second subset of the data stored via the storage system of the data platform is out-of-sync with the source copy of the data stored by the remote cloud service based on the one or more validity checks; and initiate, by the processing circuitry, a full download of the second subset of the data to the storage system of the data platform from the remote cloud service.

2. The data platform of claim 1, wherein the instructions, when executed, further configure the processing circuitry to:
obtain the remote metadata attributes from the remote cloud service without downloading file data content corresponding to the source copy of the data;
determine local metadata attributes for the data stored via the storage system of the data platform; and
validate the first subset of the data stored via the storage system of the data platform satisfies the one or more validity checks based on a comparison of the remote metadata attributes with the local metadata attributes for the data stored via the storage system of the data platform.

3. The data platform of claim 1, wherein the instructions, when executed, further configure the processing circuitry to:
obtain the remote metadata attributes from the remote cloud service without downloading file data content corresponding to the source copy of the data;
determine local metadata attributes for the data stored via the storage system of the data platform; and
determine the second subset of the data stored via the storage system of the data platform is out-of-sync with the source copy of the data at the remote cloud service based on a comparison of the remote metadata attributes with the local metadata attributes for the data stored via the storage system of the data platform.

4. The data platform of claim 3, wherein the remote metadata attributes and the local metadata attributes describe one or more of:
a file size of one or more files within the data;
a checksum value of one or more files within the data;
a file presence status or file deleted status of one or more files within the data; or
a file name of one or more files within the data.

5. The data platform of claim 1:
wherein to obtain the indication the resynchronization of the local copy of the data from the source copy is incomplete includes the instructions, when executed, to further configure the processing circuitry to receive an instruction from the remote cloud service to perform a full download of the data to resynchronize the local copy of the data with the source copy of the data stored by the remote cloud service; and
wherein the instructions, when executed, further configure the processing circuitry to download in full the second subset of the data without download of the first subset of the data determined to satisfy the one or more validity checks.

6. The data platform of claim 1, wherein to obtain the indication the resynchronization of the local copy of the data from the source copy is incomplete includes the instructions, when executed, to further configure the processing circuitry to obtain at least one of:
an indication from the remote cloud service that a determined data delta requires a full download of the data from the source copy of the data stored by the remote cloud service;
an instruction from the remote cloud service to perform a full download of the source copy of the data from the remote cloud service;
an indication from the remote cloud service that token or link configured to access the source copy of the data from the remote cloud service has expired; or an indication from the remote cloud service that a requested download of the data from the remote cloud service will be throttled.

7. The data platform of claim 1, wherein to obtain the indication the resynchronization of the local copy of the data from the source copy is incomplete includes the instructions, when executed, to further configure the processing circuitry to obtain at least one of:

an error message from the remote cloud service;

a determined latency for the resynchronization that satisfies a time-out threshold;

a determined throttling condition at the remote cloud service affecting the resynchronization of the local copy of the data from the source copy of the data stored by the remote cloud service;

a determined quantity of change operations on the data satisfies a maximum data-delta threshold;

an elapsed time since the data was last fully downloaded from the source copy of the data stored by the remote cloud service satisfies a maximum incremental backup threshold; or a determined bandwidth consumption that satisfies a bandwidth threshold.

8. The data platform of claim 1, wherein the data comprises at least one of:

a user mailbox stored by the remote cloud service;

a file stored by the remote cloud service;

a directory stored by the remote cloud service;

a virtual drive stored by the remote cloud service;

a user data repository stored by the remote cloud service; or an organization data repository stored by the remote cloud service.

9. The data platform of claim 1, wherein to initiate the resynchronization of the local copy of the data from the source copy stored by the remote cloud service includes the instructions, when executed, to further configure the processing circuitry to resynchronize the local copy of the data with the source copy stored by the remote cloud service without a full download of the data from the source copy stored by the remote cloud service.

10. The data platform of claim 1, wherein to initiate the resynchronization of the local copy of the data from the source copy stored by the remote cloud service includes the instructions, when executed, to further configure the processing circuitry to:

initiate an incremental download of the local copy of the data from the source copy stored by the remote cloud service; or initiate a partial download of the local copy of the data from the source copy stored by the remote cloud service.

11. A method comprising:

storing a local copy of data via a storage system of a data platform, wherein a remote cloud service stores a source copy of the data on a remote storage system of the remote cloud service;

initiating a resynchronization of the local copy of the data stored by the storage system of the data platform with the source copy stored by the remote cloud service;

obtaining an indication the resynchronization of the local copy of the data from the source copy is incomplete;

obtaining remote metadata attributes from the remote cloud service that correspond to the data stored via the storage system without downloading file data content corresponding to the source copy of the data from the remote storage system;

comparing the remote metadata attributes with corresponding local metadata attributes for the data stored via the storage system to determine a first subset of the data stored via the storage system of the data platform satisfies one or more validity checks;

determining that a second subset of the data stored via the storage system of the data platform is out-of-sync with the source copy of the data stored by the remote cloud service based on the one or more validity checks; and initiating a full download of the second subset of the data to the storage system of the data platform from the remote cloud service.

12. The method of claim 11, further comprising:

obtaining the remote metadata attributes from the remote cloud service without downloading file data content corresponding to the source copy of the data;

determining local metadata attributes for the data stored via the storage system of the data platform; and validating the first subset of the data stored via the storage system of the data platform satisfies the one or more validity checks based on a comparison of the remote metadata attributes with the local metadata attributes for the data stored via the storage system of the data platform.

13. The method of claim 11, further comprising:

obtaining the remote metadata attributes from the remote cloud service without downloading file data content corresponding to the source copy of the data;

determining local metadata attributes for the data stored via the storage system of the data platform; and determining the second subset of the data stored via the storage system of the data platform is out-of-sync with the source copy of the data at the remote cloud service based on a comparison of the remote metadata attributes with the local metadata attributes for the data stored via the storage system of the data platform.

14. The method of claim 13, wherein the remote metadata attributes and the local metadata attributes describe one or more of:

a file size of one or more files within the data;

a checksum value of one or more files within the data;

a file presence status or file deleted status of one or more files within the data; or a file name of one or more files within the data.

15. The method of claim 11, further comprising:

receiving an instruction from the remote cloud service to perform a full download of the data to resynchronize the local copy of the data with the source copy of the data stored by the remote cloud service; and downloading, in full, the second subset of the data without downloading the first subset of the data determined to satisfy the one or more validity checks.

16. The method of claim 11, wherein obtaining the indication the resynchronization of the local copy of the data from the source copy is incomplete includes obtaining at least one of:

receiving an indication from the remote cloud service that a determined data delta requires a full download of the data from the source copy of the data stored by the remote cloud service;

receiving an instruction from the remote cloud service to perform a full download of the source copy of the data from the remote cloud service;

receiving an indication from the remote cloud service that token or link configured to access the source copy of the data from the remote cloud service has expired; or receiving an indication from the remote cloud service that a requested download of the data from the remote cloud service will be throttled.

17. The method of claim 11, wherein obtaining the indication the resynchronization of the local copy of the data from the source copy is incomplete includes at least one of:

obtaining an error message from the remote cloud service;

determining latency for the resynchronization satisfies a time-out threshold;

determining a throttling condition at the remote cloud service is affecting the resynchronization of the local copy of the data from the source copy of the data stored by the remote cloud service;

determining a quantity of change operations on the data satisfies a maximum data-delta threshold;

determining an elapsed time since the data was last fully downloaded from the source copy of the data stored by the remote cloud service satisfies a maximum incremental backup threshold; or determining bandwidth consumption satisfies a bandwidth threshold.

18. The method of claim 11, wherein the data comprises at least one of:

a user mailbox stored by the remote cloud service;

a file stored by the remote cloud service;

a directory stored by the remote cloud service;

a virtual drive stored by the remote cloud service;

a user data repository stored by the remote cloud service; or an organization data repository stored by the remote cloud service.

19. The method of claim 11, further comprising:

synchronizing the local copy of the data with the source copy stored by the remote cloud service without a full download of the data from the source copy stored by the remote cloud service.

20. Computer-readable storage media comprising instructions that, when executed, configure processing circuitry to:

store a local copy of data via a storage system of a data platform, wherein a remote cloud service stores a source copy of the data on a remote storage system of the remote cloud service;

initiate a resynchronization of the local copy of the data stored by the storage system of the data platform with the source copy stored by the remote cloud service;

obtain an indication the resynchronization of the local copy of the data from the source copy is incomplete;

obtain remote metadata attributes from the remote cloud service that correspond to the data stored via the storage system without downloading file data content corresponding to the source copy of the data from the remote storage system;

compare the remote metadata attributes with corresponding local metadata attributes for the data stored via the storage system to determine a first subset of the data stored via the storage system of the data platform satisfies one or more validity checks;

determine that a second subset of the data stored via the storage system of the data platform is out-of-sync with the source copy of the data stored by the remote cloud service based on the one or more validity checks; and initiate a full download of the second subset of the data to the storage system of the data platform from the remote cloud service.

* * * * *